No. 851,951. PATENTED APR. 30, 1907.
B. & F. LJUNGSTRÖM.
OPERATING DEVICE FOR MILKING MACHINES.
APPLICATION FILED JAN. 24, 1907.
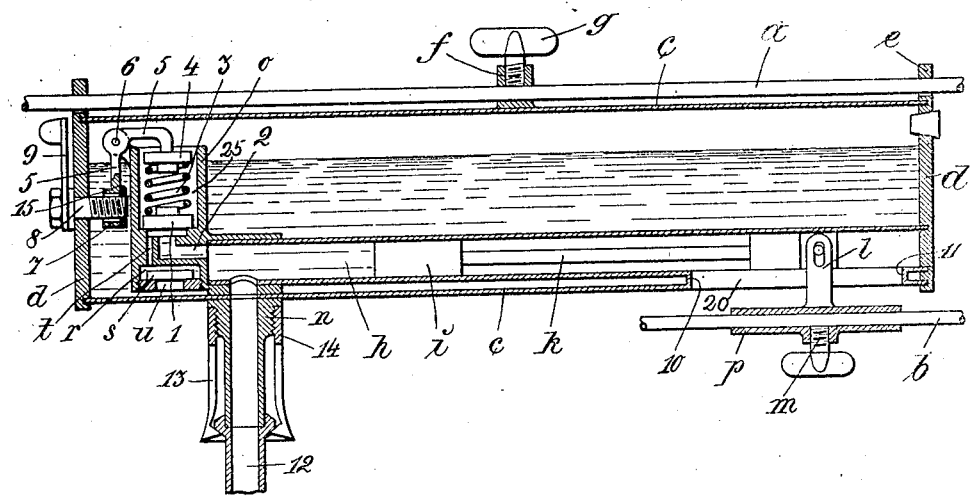
WITNESSES:
M. M. Hamilton
E. E. Wall
INVENTORS
Birger Ljungström
Fredrik Ljungström
BY
Hueling & Hueling
ATTORNEYS.

UNITED STATES PATENT OFFICE.

BIRGER LJUNGSTRÖM AND FREDRIK LJUNGSTRÖM, OF STOCKHOLM, SWEDEN, ASSIGNORS TO AKTIEBOLAGET SEPARATOR, OF STOCKHOLM, SWEDEN.

OPERATING DEVICE FOR MILKING-MACHINES.

No. 851,951.

Specification of Letters Patent.

Patented April 30, 1907.

Application filed January 24, 1907. Serial No. 353,932.

*To all whom it may concern:*

Be it known that we, BIRGER LJUNGSTRÖM and FREDRIK LJUNGSTRÖM, subjects of the King of Sweden, and residing at Fleminggatan 8, Stockholm, Sweden, have invented certain new and useful Improvements in Operating Devices for Milking-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to improvements in such operating devices for milking machines that consist of wires or rods, having a reciprocating motion and being connected with a pump, by which fluid is forced at fixed intervals to the milking portions of the machine, thereby actuating them to press upon the teats.

Our invention has for its object to avoid the inconvenience which arises in such operating devices thereby, that the fluid leaks from the pump, which, if the quantity of the fluid leaked out were not refilled again, would cause the pump to give an end pressure, which would diminish for each stroke of the piston. According to the present invention the said inconvenience is avoided thereby, that the pump-cylinder is connected with a fluid receptacle by means of a suction and a force valve. Through the suction valve a small quantity is for each stroke of the piston sucked from the receptacle into the pump-cylinder and if too great a quantity of fluid has passed through said valve, a part of it is forced out through the force valve during the next stroke.

Our invention further has for its object to avoid the inconvenience arising therefrom, that some cows are "hard-milked" and others are "loose-milked." This is accomplished by holding the force valve on its seat by means of a weight or a spring, whose pressure may be regulated in any suitable way, for instance by means of a screw. By regulating the pressure on the valve, the end pressure in the pump cylinder will be regulated and thus also the end pressure in the milking organs and on the teats.

Our invention further has for its object to connect the liquid conduit with the pump by means of a coupling, which makes the pump loose from said conduit, as soon as there is a draft in it.

The invention is shown on the annexed drawing.

Figure 1 is a longitudinal section of the pump and Fig. 2 is an end view.

In the Figs. *a* and *b* are two wires or rods, the one being fixed and the other having a reciprocating motion or both wires moving in opposite directions.

*c* is a cylinder which is more or less filled with a fluid, for instance water, and which is provided with two ends *d* from which the ears *e* project. In the middle of the cylinder there is a projecting lug *f*, which is provided with a groove, wherein the wire *a* fits and is further provided with a wing-screw *g*, by means of which the wire *a* may be secured in the groove.

In the cylinder *c* there is arranged a pump-cylinder *h*, wherein the piston *i* with the piston rod *k* can move. Said piston rod *k* is connected with an arm *l*, which, carrying the grooved lug *p* by means of the wing-screw *m* can be rigidly secured to the wire *b*.

From the end of the pump cylinder *h* a mouth-piece *n* projects, which, by means of a device, described below, can be coupled to the conduit leading to the milking machine. At the same end of the pump cylinder *h* there is arranged inside the cylinder *c* a valve housing *o*, containing a suction valve and a force valve. The former consists of a small chamber *r*, wherein a disk *s* nearly filling up the whole chamber, is arranged. Said chamber communicates with the cylinder *h* by means of a narrow channel *t* and with the cylinder *a* by the hole *u*. By forming the suction valve in this way only a very small quantity of fluid is sucked into the pump cylinder *h* for each stroke of the piston *i*. If too great a quantity should be sucked into the pump cylinder *h* a part of said quantity will be forced out through the force valve. Said force valve consists of a disk 1 covering the mouth of the channel 2, by which the force chamber 25 communicates with the pump cylinder *h*. The disk 1 is pressed against its seat by means of a spiral spring 3, which abuts against the upper disk 4 and acts to press the disks 1 and 4 away from each other. The tension of the spring is such as to counteract the maximum pressure of the liquid in the pump cylinder $h$. If said pressure should tend to rise above said maximum pressure, which would occur if too great a quantity of liquid had been sucked into the pump-cylinder the moment before, a part of the liquid will escape through the force valve, so that the maximum pressure, with which the pump is intended to work, cannot be exceeded. The said maximum pressure can be regulated for "hard-milked" or "loose-milked" cows by regulating the tension of the spring 3. This is accomplished, preferably, by connecting the disk 4 with a lever 5 turning on a pivot 6 and provided with a bored lug 7, through which the threaded bolt 8 passes. 15 is a nut, abutting against the lug 7, and moving on the bolt, when it is turned. The bolt, which is journaled in the end $d$, is connected with an arm 9 turning over a scale on the surface of the end $d$. By means of this device the disk 4 can be screwed nearer to the disk 1, whereby said disk on account of the greater pressure thereon of the spring 3, will hold the opening of the channel 2 closed with a greater force, so that the maximum end pressure in the cylinder $h$, when the piston reciprocates, will be greater than before. The end pressure in the cylinder $h$ for each stroke of the piston can in this way be regulated and on account thereof the end pressure in the milking machine and the end pressure of the milking organs on the teats.

The pump is secured to the wires $a$ and $b$ in the following way: The receptacle $c$ is hooked on the wire $a$ by means of the ears $e$ and is then secured to said wire by means of the screw $g$. The wire $b$ is then placed in the lug $p$ and the screw $m$ is screwed down so as to just abut against the wire. When the wire $b$ reciprocates, the arm $l$ will abut against the end surfaces 10 and 11 of the opening 20 in the mantle of the pump cylinder and the lug $p$ will then slide on the wire, until the arm $l$ contacts with either the surface 10 or 11. Then the screw $m$ is screwed down tightly. In order to connect the pump with the liquid conduit so that they are disconnected as soon as there is a draft in the conduit, is used a coupling of a special construction. The mouth piece $n$ is surrounded by a shell 14, having projecting springing arms 13, the ends of which are curved or swelled, so as to inclose the swelled head of a metal tube 12, which ends the conduit. When the end of said tube 12 abuts against the mouth-piece $n$, the springing arms 13 grasp over the head of the tube 12 and hold it in position.

Having now fully described our invention, what we claim and desire to protect by Letters Patent is:

1. In pump operating devices for milking machines, in combination, wires having a relative reciprocating motion, a pump connected therewith and a fluid receptacle, communicating with the pump cylinder, a suction valve and a force valve controlling the communication between the pump cylinder and receptacle.

2. In pump operating devices for milking machines, in combination, wires having a reciprocating motion in relation to each other, a pump connected therewith and a fluid receptacle, inclosing said pump and communicating with the pump cylinder, a suction and a force valve controlling the communication between the pump cylinder and receptacle.

3. In pump operating devices for milking machines, in combination, wires having a relative reciprocating motion, a pump cylinder, connected with the one wire, a piston in the said cylinder, connected with the other wire, a fluid receptacle, inclosing said cylinder and communicating therewith, a suction valve and a force valve controlling the communication between the pump cylinder and receptacle.

4. In pump operating devices for milking machines, in combination, wires having a relative reciprocating motion, a pump connected therewith and a fluid receptacle, communicating with the pump cylinder by means of a suction valve, and a force valve controlling the connection between the pump cylinder and receptacle, and means to produce and regulate pressure upon the force valve against movement to open.

5. In pump operating devices for milking machines, in combination, wires having a relative reciprocating motion, a pump connected therewith and a fluid receptacle, communicating with the pump cylinder, a suction valve, and a force valve controlling the communication between the pump cylinder and receptacle, and a spring acting upon the force valve.

6. In pump operating devices for milking machines, in combination, wires having a relative reciprocating motion, a pump connected therewith and a fluid receptacle, communicating with the pump cylinder, a suction valve, and a force valve controlling the communication between the pump cylinder and receptacle, a spring acting upon the force valve, and means to vary the power of said spring.

7. In pump operating devices for milking machines, in combination, wires having a relative reciprocating motion, a pump connected therewith and a fluid receptacle, communicating with the pump cylinder, a suction valve, and a force valve controlling the communication between the pump cylinder and receptacle, a spring acting upon the force valve, a device, exterior of the apparatus, for varying the power of the spring and connection between the device and spring.

8. In pump operating devices for milking machines, in combination, wires having a relative reciprocating motion, a pump connected therewith and a fluid receptacle, communicating with the pump cylinder by means of a suction valve, and a force valve controlling the connection between the pump cylinder and receptacle, and means to produce pressure upon the force valve.

9. In pump operating devices for milking machines, in combination, wires having a relative reciprocating motion, a pump connected therewith and a fluid receptacle, communicating with the pump cylinder, and a disk covering the opening by which the pump cylinder communicates with the liquid receptacle.

10. In pump operating devices for milking machines, in combination, wires having a relative reciprocating motion, a pump connected therewith and a fluid receptacle, communicating with the pump cylinder, a disk, closing an opening by which the pump cylinder communicates with the fluid receptacle, and pressure means tending to hold said valve on its seat.

11. In pump operating devices for milking machines, in combination, wires having a relative reciprocating motion, a pump connected therewith and a fluid receptacle, communicating with the pump cylinder, a disk, closing an opening by which the pump cylinder communicates with the fluid receptacle, pressure means tending to hold said valve on its seat, and means to vary the power of said pressure means.

12. In pump operating devices for milking machines, in combination, wires having a relative reciprocating motion, a pump connected therewith and a fluid receptacle, communicating with the pump cylinder, a disk, closing an opening by which the pump cylinder communicates with the fluid receptacle, and a spring acting on said disk to press it against its seat.

13. In pump operating devices for milking machines, in combination, wires having a relative reciprocating motion, a pump connected therewith and a fluid receptacle, communicating with the pump cylinder, a disk, closing an opening by which the pump cylinder communicates with the fluid receptacle, and a spring acting on said disk to press it against its seat, and means to vary the power of said spring.

14. In pump operating devices for milking machines, in combination, wires having a relative reciprocating motion, a pump connected therewith and a liquid receptacle communicating with the pump cylinder, a force valve, consisting of a disk, closing an opening by which the pump cylinder communicating with the fluid receptacle, a spring pressing said valve on its seat abutting with one end against the disk, a second disk against which the other end of said spring abuts, a lever extending to the exterior of the apparatus to which said second disk is connected whereby the space between said disks may be varied, varying the power of the spring.

15. In pump operating devices for milking machines, in combination, wires having a relative reciprocating motion, a pump connected therewith and a fluid receptacle, communicating with the pump cylinder, a disk, closing an opening by which the pump cylinder communicates with the liquid receptacle, a spiral spring, abutting with one end against said disk, a second disk against which the other end of the spring abuts, a lever connected with said second disk, a screw, engaging the end of said lever, said screw being journaled in the bottom of the liquid receptacle, and an arm connected with the screw and moving over a scale.

In testimony of which invention, we have hereunto set our hands, at Stockholm, on this 9th day of January, 1907.

BIRGER LJUNGSTRÖM.
FREDRIK LJUNGSTRÖM.

Witnesses:
HJAHUM ZELTERSTROM,
HARRY ALBIHN.